US00RE43522E

(19) United States
(12) Reissued Patent
Kataoka et al.

(10) Patent Number: US RE43,522 E
(45) Date of Reissued Patent: Jul. 17, 2012

(54) MALE AND FEMALE CONNECTION STRUCTURE

(75) Inventors: Yuta Kataoka, Hitachi (JP); Hideaki Takehara, Hitachi (JP); Kunihiro Fukuda, Tsukuba (JP); Sachio Suzuki, Hitachi (JP)

(73) Assignee: Hitachi Cable, Ltd., Tokyo (JP)

(21) Appl. No.: 13/137,346

(22) Filed: Aug. 8, 2011

Related U.S. Patent Documents

Reissue of:
(64) Patent No.: 7,798,870
Issued: Sep. 21, 2010
Appl. No.: 12/588,990
Filed: Nov. 4, 2009

(30) Foreign Application Priority Data

Nov. 21, 2008 (JP) ..... 2008-297816

(51) Int. Cl.
*H01R 13/187* (2006.01)
(52) U.S. Cl. ..... 439/843; 439/748; 439/866
(58) Field of Classification Search ..... 439/748, 439/835, 837, 843, 832, 866, 259, 263, 265
See application file for complete search history.

(56) References Cited

U.S. PATENT DOCUMENTS 6,083,023 A * 7/2000 Kamath ..... 439/263
7,527,513 B1 * 5/2009 Okuyama et al. ..... 439/267

FOREIGN PATENT DOCUMENTS

JP 2006-216272 8/2006
JP 2007-280729 A 10/2007

OTHER PUBLICATIONS

Notification of Reasons for Refusal dated May 15, 2012 (with an English translation).

* cited by examiner

*Primary Examiner* — Tho D Ta
(74) *Attorney, Agent, or Firm* — McGinn IP Law Group, PLLC

(57) ABSTRACT

A male and female connection structure includes a female terminal, and a male terminal to electrically connect to the female terminal by being inserted into a connection position of the female terminal and to electrically disconnect from the female terminal by being withdrawn from the connection position. The female terminal includes a dimple to electrically connect to the male terminal, a male terminal pressing spring disposed opposite the dimple for pressing the male terminal to be inserted on the dimple against the dimple, and a press switching part for switching between a non-pressed state that the male terminal pressing spring does not press the male terminal located in the female terminal and a pressed state that the male terminal pressing spring presses the male terminal located in the female terminal by changing a shape of the male terminal pressing spring. The press switching part switches the non-pressed state to the pressed state, when the male terminal is inserted into the connection position, by using an insertion force applied when the male terminal is inserted into the female terminal, and it switches the pressed state to the non-pressed state, when the male terminal is withdrawn from the connection position, by using a withdrawal force applied when the male terminal is withdrawn from the female terminal.

15 Claims, 14 Drawing Sheets

MALE AND FEMALE CONNECTION STRUCTURE

Matter enclosed in heavy brackets [ ] appears in the original patent but forms no part of this reissue specification; matter printed in italics indicates the additions made by reissue.

The present application is based on Japanese patent application No. 2008-297816 filed on Nov. 21, 2008, the entire contents of which are incorporated herein by reference.

BACKGROUND OF THE INVENTION

1. Field of the Invention

This invention relates to a male and female connection structure and, in particular, to a male and female connection structure suited for carrying large current.

2. Description of the Related Art

A connector as a conventional male and female connection structure is known, the connector comprising a male connector and a female connector being able to be fitted into a hood part of a male connector housing having a male tab, where a lock arm is formed on the female connector housing having a female terminal fitting, and a pressing part formed on the lock arm presses down a receiving part of an elastic contact segment for sandwiching the male tab formed in the female terminal fitting together with the start of fitting operation between the male connector and the female connector, so that before the male tab contacts the contact part of the contact segment, the contact part is pressed down. This technique is disclosed in JP-A-2006-216272.

The male and female connection structure described in JP-A-2006-216272 has a structure that the contact part of the contact segment is elastically changed in the shape in a direction getting away from the male tab together with the start of fitting operation, so that a fitting resistance is reduced and reduction of an insertion force can be realized.

However, since the connector as a conventional male and female connection structure disclosed in JP-A-2006-216272 has a structure that the pressing part is pressed down by that an operator presses the elastic contact segment by using the lock arm separately from the fitting operation between the male connector and the female connector, as a result, it is difficult that the fitting operation between the male connector and the female connector is easily carried out. Particularly, the difficulty is remarkably increase in the case that an energizing force of the elastic contact segment is enlarged as a countermeasure against a vibration affecting the fitting condition between the male tab (male terminal) and the female terminal fitting (female terminal). Further, the above-mentioned problem occurs in a case that the male terminal is inserted into the female terminal, but, on the contrary, it similarly occurs in a case that the male terminal is removed from the female terminal.

SUMMARY OF THE INVENTION

Therefore, it is an object of the invention to solve the above-mentioned problem and provide a male and female connection structure that is capable of easily inserting and removing a male terminal into (from) a female terminal, even if a male terminal hold spring having a large energizing force is used.

(1) According to one embodiment of the invention, a male and female connection structure comprises:

a female terminal; and a male terminal to electrically connect to the female terminal by being inserted into a connection position of the female terminal and to electrically disconnect from the female terminal by being withdrawn from the connection position, wherein the female terminal comprises:

a dimple to electrically connect to the male terminal;

a male terminal pressing spring disposed opposite the dimple for pressing the male terminal to be inserted on the dimple against the dimple; and a press switching part for switching between a non-pressed state that the male terminal pressing spring does not press the male terminal located in the female terminal and a pressed state that the male terminal pressing spring presses the male terminal located in the female terminal by changing a shape of the male terminal pressing spring, wherein the press switching part switches the non-pressed state to the pressed state, when the male terminal is inserted into the connection position, by using an insertion force applied when the male terminal is inserted into the female terminal, and the press switching part switches the pressed state to the non-pressed state, when the male terminal is withdrawn from the connection position, by using a withdrawal force applied when the male terminal is withdrawn from the female terminal.

In the above embodiment (1), the following modifications and changes can be made.

(i) The press switching part comprises a spring insertion opening for engaging with an edge part of the male terminal pressing spring before the male terminal is inserted into the female terminal, and a male terminal insertion opening for engaging with an end part of the male terminal at a position adjacent to the spring insertion opening, and when the male terminal moves to the connection position along an insertion direction in which the male terminal is inserted while the end part of the male terminal is engaged with the male terminal insertion opening, the spring insertion opening is disengaged from the edge part of the male terminal pressing spring so as to switch the non-pressed state to the pressed state.

(ii) When the male terminal moves along a withdrawal direction in which the male terminal is withdrawn and away from the connection position while the end part of the male terminal is engaged with the male terminal insertion opening, the spring insertion opening is engaged with the edge part of the male terminal pressing spring so as to switch the pressed state to the non-pressed state.

(iii) The press switching part is movable with respect to the male terminal pressing spring along the insertion direction and the withdrawal direction.

(iv) After the male terminal is inserted into the female terminal and the end part of the male terminal is engaged with the male terminal insertion opening, the press switching part moves to the connection position according as the male terminal moves in the insertion direction, and the spring insertion opening is disengaged from the edge part of the male terminal pressing spring at the connection position according as the male terminal moves in the insertion direction.

(v) The press switching part moves according as the male terminal moves in the withdrawal direction, and the spring insertion opening is engaged with the edge part of the male terminal pressing spring at a position away from the connection position in the withdrawal direction according as the male terminal moves in the withdrawal direction.

Points of the Invention

According to one embodiment of the invention, a male and female connection structure is constructed such that a female terminal is provided with a plate that is capable of automatically switching a shape of a plate spring for pressing a male terminal against a dimple between a pressed state and a non-pressed state according as the male terminal is inserted into the female terminal. Therefore, even when the male terminal is inserted/withdrawn into/from the female terminal, it is not necessary for the operator to press down the plate spring separately by using a lock arm or the like and a force can be prevented from being applied by the plate spring to the male terminal. Thus, the male terminal can be easily inserted/withdrawn into/from the female terminal.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Embodiment

Figure 1A:
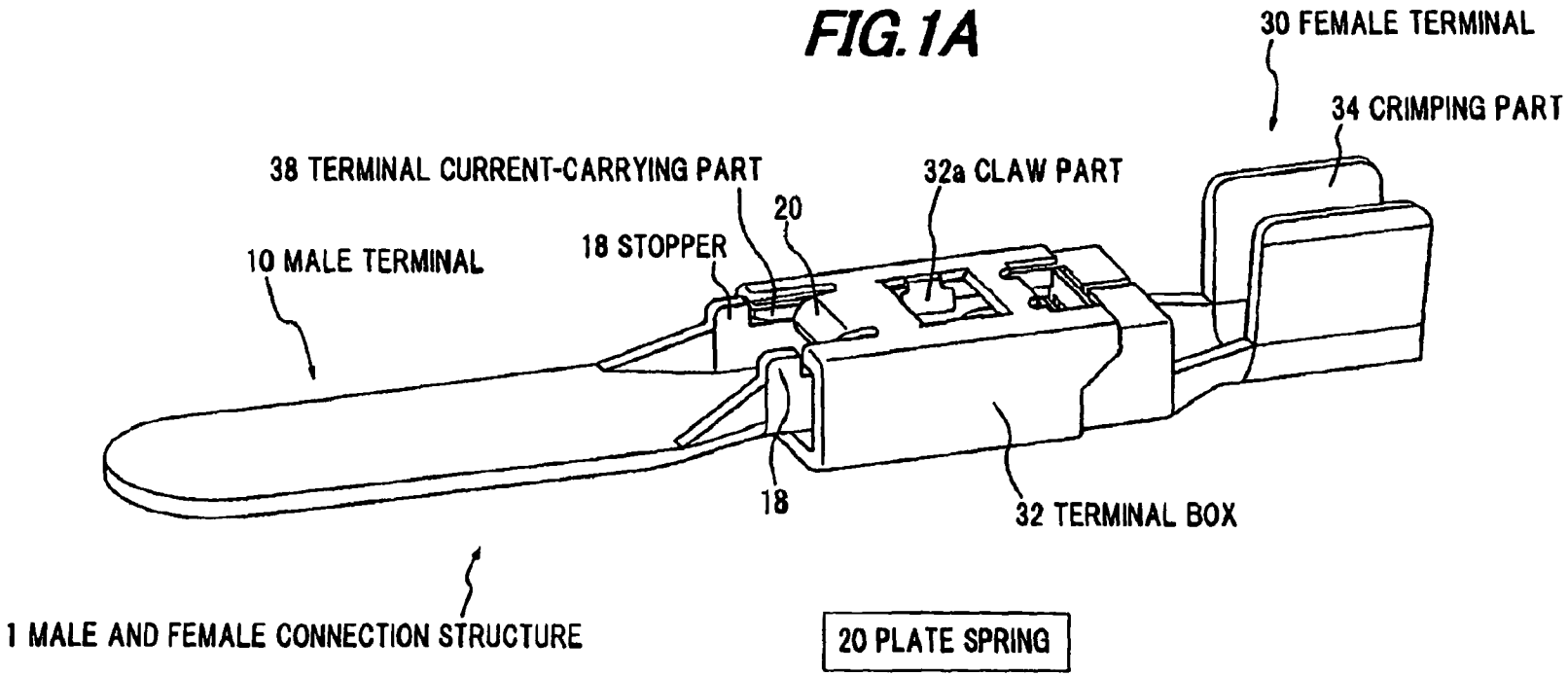
FIG. 1A is a perspective view schematically showing a male and female connection structure according to one embodiment of the invention.

The preferred embodiments according to the invention will be explained below referring to the drawings.

Figure 1B:
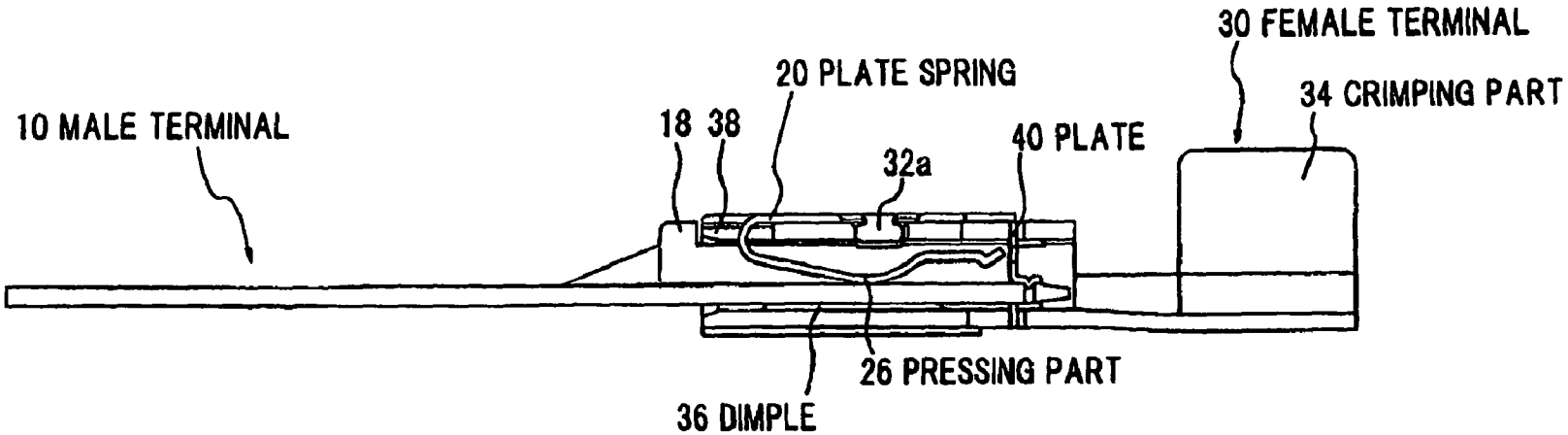
FIG. 1B is a longitudinal cross-sectional view schematically showing a male and female connection structure according to one embodiment of the invention.
Figure 1C:
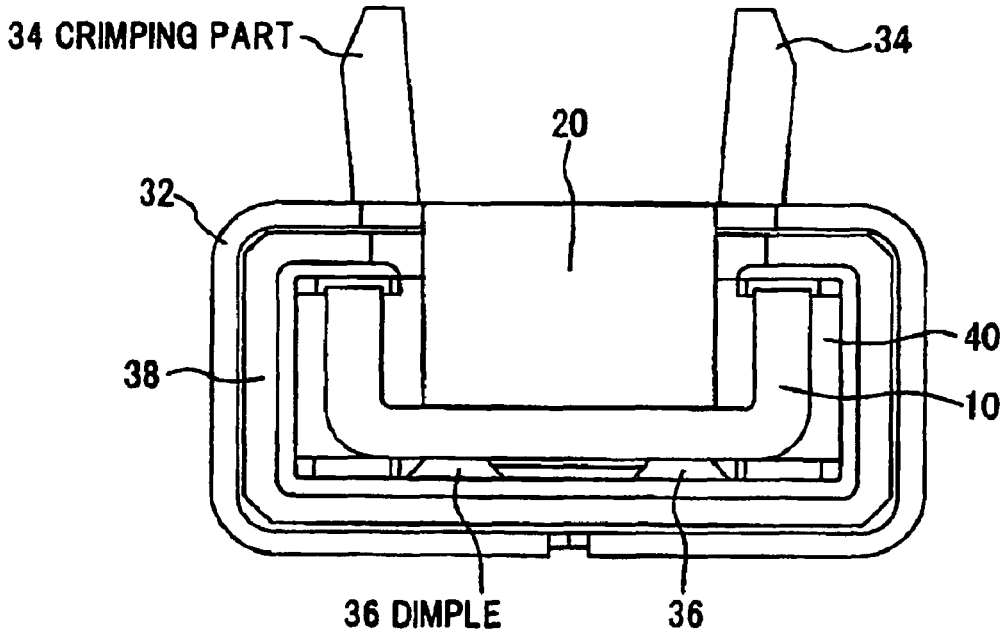
FIG. 1C is a transverse cross-sectional view schematically showing a male and female connection structure according to one embodiment of the invention.

FIG. 1A is a perspective view schematically showing a male and female connection structure according to one embodiment of the invention, FIG. 1B is a longitudinal cross-sectional view schematically showing a male and female connection structure according to one embodiment of the invention and FIG. 1C is a transverse cross-sectional view schematically showing a male and female connection structure according to one embodiment of the invention.

Outline of Male and Female Connection Structure

First, referring to FIG. 1, a male and female connection structure 1 according to the embodiment includes a male terminal 10 and a female terminal 30 to be electrically connected to the male terminal 10. The female terminal 30 includes a terminal body part having a terminal current-carrying part 38 of a box shape to which the male terminal 10 is inserted and a crimping part 34 formed on the side of one end of the terminal current-carrying part 38 for fixing a wire (not shown) to the female terminal 30, and a terminal box 32 having almost the same shape as the terminal current-carrying part 38 of the terminal body part, to be fitted to the terminal body part 38 and to be fixed to the terminal current-carrying part 38 by a claw part 32a. And, the terminal box 32 includes a plate spring 20 integrally formed with the terminal box 32 as a spring for pressing the male terminal. And, the male terminal 10 has a stopper 18 which contacts one end of the terminal box 32 and/or terminal current-carrying part 38 when inserted into the female terminal. The male terminal 10 is inserted into the female terminal 30, and is fixed to and held in the female terminal 30 by the plate spring 20.

Further, the male and female connection structure 1 according to the embodiment is shown, as an example, in a case that it is used for a connection of a motor and an inverter which drive a hybrid electric vehicle (HVE) capable of reducing a discharge of toxic gases and reducing a fuel consumption extremely, and dependent on a system of the HEV, in a case that it is used for a high-capacity electric power harness where large current of not less than 100 A is carried. Particularly, it is shown in a case that it is adopted to a male connector of a dual-partitioning type formed by that a male housing where the male terminal 10 is housed and a female housing where the female terminal 30 is housed are fitted, the male connector being installed on the side of one end of the high-capacity electric power harness. Namely, an end part (a connection part 12 described below) of the male terminal 10 located in a side that is not inserted into the female terminal 30 is a male terminal of the male connect or of the high-capacity electric power harness, and is inserted into the motor and/or the inverter.

FIG. 1B is a longitudinal cross-sectional view schematically showing the male and female connection structure 1 in a state that the male terminal 10 and the female terminal 30 are electrically connected to each other. The female terminal 30 has a dimple 36 electrically connectable to the male terminal 10 in an inner surface of the terminal current-carrying part 38. And, the plate spring 20 is formed so as to face to the dimple 36 and has a pressing part 26 for pressing the male terminal 10 inserted into the terminal box 32 (terminal current-carrying part 38) toward the dimple 36. The male terminal 10 is inserted into a place that is on the dimple 36 and at a lower side of the pressing part 26 of the plate spring 20. Further, although details will be described below, the female terminal 30 has a plate 40 as a press switching part for switching a shape of the plate spring 20 between a shape in a state (a pressed state) that the plate spring 20 presses the male terminal 10 and a shape in a state (a non-pressed state) that the plate spring 20 does not press the male terminal 10 in the terminal box 32.

FIG. 1C is a transverse cross-sectional view schematically showing the male and female connection structure 1 in a state that the male terminal 10 and the female terminal 30 are electrically connected to each other. The male terminal 10 is formed so as to have a shape that at least a part thereof to be inserted into the terminal box 32 has a U-shaped cross-section. And, the male terminal 10 is electrically connected to the dimples 36 by that it is pressed toward a dimple 36 of the female terminal 30 by the plate spring 20 so as to be held by the female terminal 30.

Detail of Male Terminal 10

Figure 2:
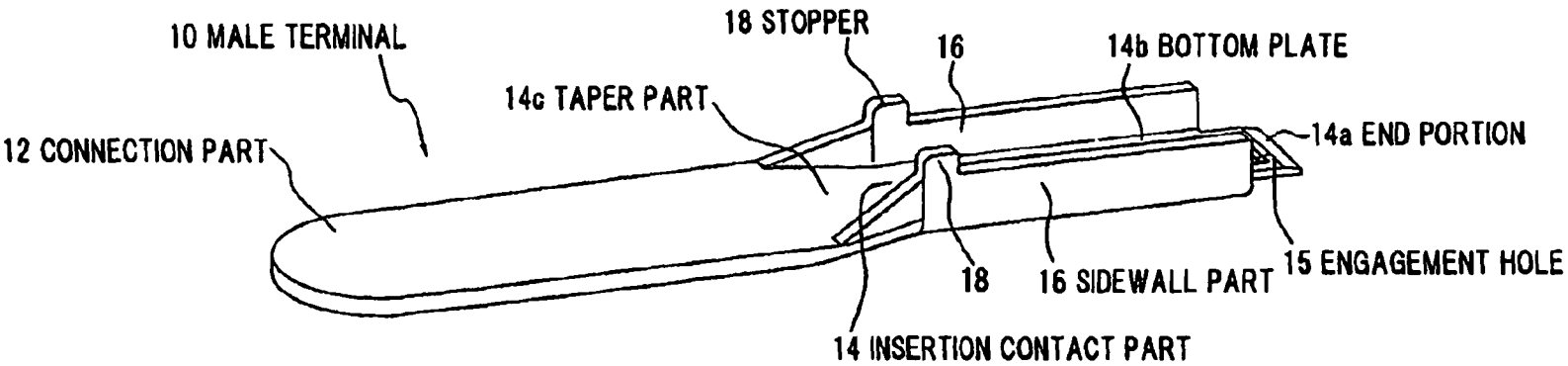
FIG. 2 is a perspective view schematically showing a male terminal used for one embodiment of the invention.

FIG. 2 is a perspective view schematically showing a male terminal used for one embodiment of the invention.

The male terminal 10 used for the embodiment is formed of a plate material having a long and thin shape which is formed of a high electrical conducting material such as copper. Particularly, the male terminal 10 includes the connection part 12 formed in one end to electrically connect to an external electric equipment, an insertion contact part 14 formed so as to extend from the connection part 12 to another end, sidewall parts 16 formed almost perpendicularly to a surface of the insertion contact part 14 along the longitudinal direction of the insertion contact part 14, and stoppers 18 formed at ends of the sidewall parts 16. The upper surfaces of the stoppers 18 are formed so as to be higher than the upper surfaces of the sidewall parts 16, where the height means a height from a bottom plate 14b.

And, the insertion contact part 14 includes an end portion 14a formed at an end part of an opposite side of the connection part 12 (at an another end of the male terminal 10), a taper part 14c having a width that gradually becomes narrow toward the end portion 14a from the connection part 12, and the bottom plate 14b formed between the taper part 14c and the end portion 14a. Further, the sidewall parts 16 is formed along edges of the bottom plate 14b and the taper part 14c. And, the end portion 14a has an engagement hole 15 which is engaged with a plate 40 described below.

Further, the male terminal 10 can be formed of a high electrical conducting material having an electric conductivity of not less than 60% IACS. It is preferable that the terminal is formed of a high electrical conducting material having an electric conductivity of not less than 93% IACS. For example, the male terminal 10 can be formed of an oxygen free high conductivity copper having an electric conductivity of not less than 97% IACS. Further, "IACS" is short for "International Annealed Copper Standard".

Detail of Female Terminal 30

Figure 3:
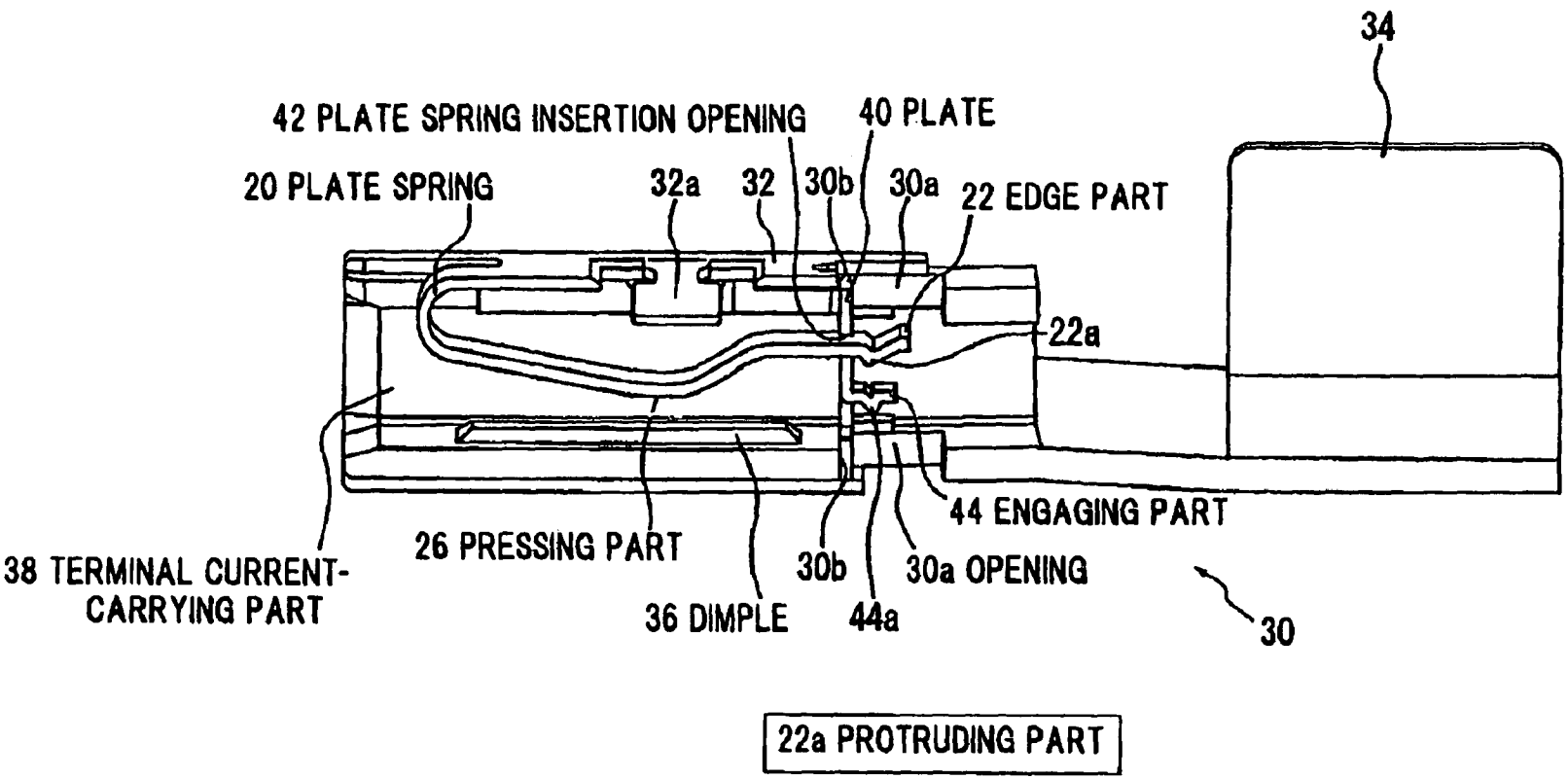
FIG. 3 is a perspective view schematically showing a female terminal used for one embodiment of the invention.

FIG. 3 is a perspective view schematically showing a female terminal used for one embodiment of the invention.

The female terminal 30 used for the embodiment includes a terminal box 32 formed so as to have a box shape having a hollow square-shaped cross-section, a claw part 32a formed on an upper surface of the terminal box 32 and being able to be bent toward an inside of the terminal box 32, a terminal current-carrying part 38 fixed to an inside of the terminal box 32 by the claw part 32a and formed so as to have a box shape having a hollow square-shaped cross-section, a plate spring 20 integrally formed with the terminal box 32, a dimple 36 formed so as to electrically connect to the terminal current-carrying part 38 and so as to face to the plate spring 20, and being able to be electrically connected to the male terminal 10 to be inserted, and a crimping part 34 formed in an opposite side to the terminal box 32 into which the male terminal 10 is inserted.

The plate spring 20 includes a pressing part 26 for pressing the bottom plate 14b of the male terminal 10 to be inserted into the terminal current-carrying part 38 toward the dimple 36 (toward the lower surface of the terminal box 32), and an edge part 22 having a protruding part 22a whose protrusion is directed toward the lower surface of the terminal box 32. The plate spring 20 is bent from the upper surface toward the lower surface of the terminal box 32 via a curved part, extends up to near the center of terminal box 32 on a plan view from the bent part toward the crimping part 34 at a gentle downward gradient, and after extends from the pressing part 26 closest to the dimple 36 at an upward gradient, is formed so as to have a shape that includes the edge part 22 having a protruding part 22a via a part extending in a perpendicular direction to a surface of the plate 40, in a state that the edge part 22 of the plate spring 20 is held in the plate 40. And, the plate spring 20 presses the bottom plate 14b of the male terminal 10 to be inserted into the terminal current-carrying part 38 toward the dimple 36, so that it allows the bottom plate 14b and the dimple 36 to be electrically connected and allows the male terminal 10 to be fixed to and held in the female terminal 30.

And, the female terminal 30 includes the plate 40 having a plate spring insertion opening 42 into which the edge part 22 of the plate spring 20 is inserted and which is engaged with the plate spring 20 by the protruding part 22a of the edge part 22, and a male terminal insertion opening 46 into which the end portion 14a of the male terminal 10 and which is engaged with the male terminal 10 by a protruding part 44a of the engaging part 44. Here, the terminal current-carrying part 38 has an opening 30a in each of the upper surface and the lower surface. And, the plate 40 is formed, so that it is relatively movable to the plate spring 20 and the terminal current-carrying part 38, and a plate upper part and a plate lower part thereof are inserted into the opening 30a formed in the terminal current-carrying part 38, and simultaneously, the plate upper part and the plate lower part thereof are brought into contact with an opening sidewall 30b of the opening 30a. Further, details of the plate upper part and the plate lower part will be explained below.

In the embodiment, in a state that the male terminal 10 and the female terminal 30 are not electrically connected to each other (including a case that the male terminal 10 is not inserted into the female terminal 30), the edge part 22 of the plate spring 20 is inserted into the plate spring insertion opening 42 and the protruding part 22a of the edge part 22 is engaged with the plate spring insertion opening 42. Due to the fact that the protruding part 22a of the edge part 22 is engaged with the plate spring insertion opening 42, the plate spring 20 is maintained to have a shape that a distance between a surface of the dimple 36 and a surface of the pressing part 26 is broader than a thickness of the male terminal 10 (particularly, the bottom plate 14b) to be inserted.

On the other hand, in a state that the male terminal 10 and the female terminal 30 are electrically connected to each other, the edge part 22 of the plate spring 20 is removed from the plate spring insertion opening 42, so that the edge part 22 of the plate spring 20 is released from the plate spring insertion opening 42. When the male terminal 10 is inserted up to a predetermined position of the female terminal 30 and the edge part 22 of the plate spring 20 is released from the plate spring insertion opening 42, the plate spring 20 is maintained to have a shape that a distance between a surface of the dimple 36 and a surface of the pressing part 26 is not broader than a thickness of the male terminal 10 (particularly, the bottom plate 14b) to be inserted. In this case, the male terminal 10 is pressed toward the dimple 36 by the pressing part 26.

The terminal current-carrying part 38 is formed of a high electrical conducting material such as copper. Particularly, the terminal current-carrying part 38 can be formed of a high electrical conducting material having an electric conductivity of not less than 60% IACS. And, it is preferable that the terminal current-carrying part 38 is formed of a high electrical conducting material having an electric conductivity of not less than 93% IACS. For example, the terminal current-carrying part 38 can be formed of an oxygen free high conductivity copper having an electric conductivity of not less than 97% IACS. And, the terminal current-carrying part 38 is covered with the terminal box 32 formed of a material which has a larger mechanical strength than a material constituting the terminal current-carrying part 38 and is held in the terminal box 32. Here, the terminal box 32 and the plate 40 can be formed of SUS which is superior to a stress relaxation characteristic.

Detail of Plate 40

Figure 4:
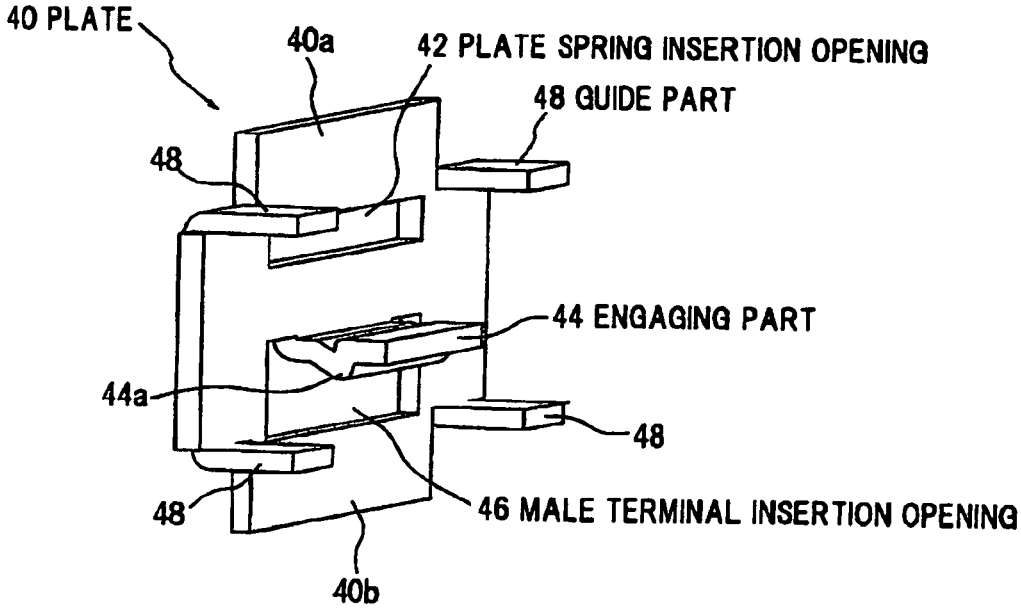
FIG. 4 is a perspective view schematically showing a plate used for one embodiment of the invention.

FIG. 4 is a perspective view schematically showing a plate used for one embodiment of the invention.

The plate 40 used for the embodiment includes a plate upper part 40a, a plate lower part 40b opposite to the plate upper part 40a, a plate spring insertion opening 42 formed between the plate upper part 40a and the plate lower part 40b as a spring insertion opening and a male terminal insertion opening 46 formed at a location adjacent to the plate spring insertion opening 42, an engaging part 44 formed on the side of the plate spring insertion opening 42 of the male terminal insertion opening 46 and toward a normal direction of the surface of the plate 40 and four guide parts 48 formed by bending four corners of a flat plate almost at a right angle. Further, the guide parts 48 prevent the plate 40 from inclining to the terminal box 32 when the plate 40 moves along an inner wall of the terminal current-carrying part 38.

The edge part 22 of the plate spring 20 is inserted into the plate spring insertion opening 42 and the protruding part 22a of the edge part 22 is engaged with the plate spring insertion opening 42, so that the plate spring insertion opening 42 holds the edge part 22 of the plate spring 20. Further, the plate spring insertion opening 42 is engaged with the edge part 22 of the plate spring 20 before the male terminal 10 is inserted into the female terminal 30. And, the male terminal insertion opening 46 is an opening into which the end portion 14a of the male terminal 10 is inserted. And, when the end portion 14a is inserted into the male terminal insertion opening 46, the protruding part 44a of the engaging part 44 is engaged with the engagement hole 15. Due to this, the end portion 14a of the male terminal 10 is engaged with the plate 40.

Connection Method of Male Terminal 10 and Female Terminal 30

Figure 5:
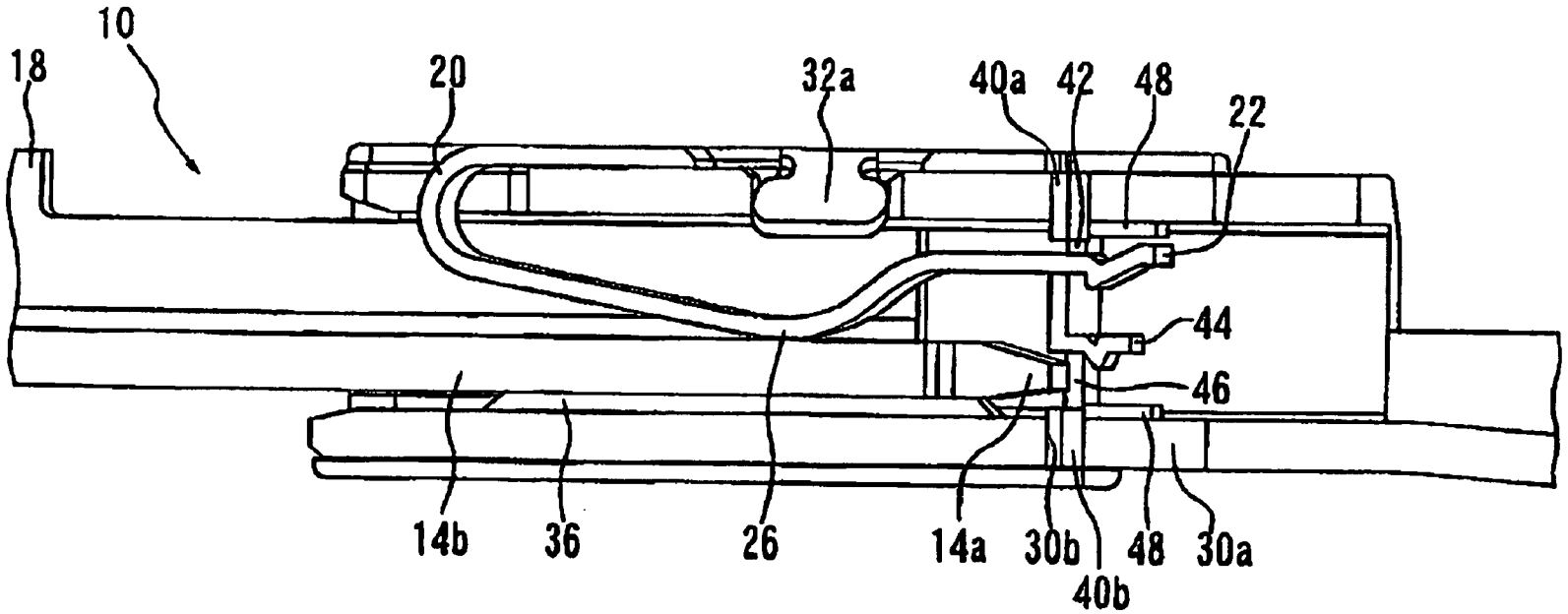
FIG. 5 is a perspective view schematically showing a state in the process of inserting the male terminal into the female terminal in one embodiment of the invention.
Figure 6:
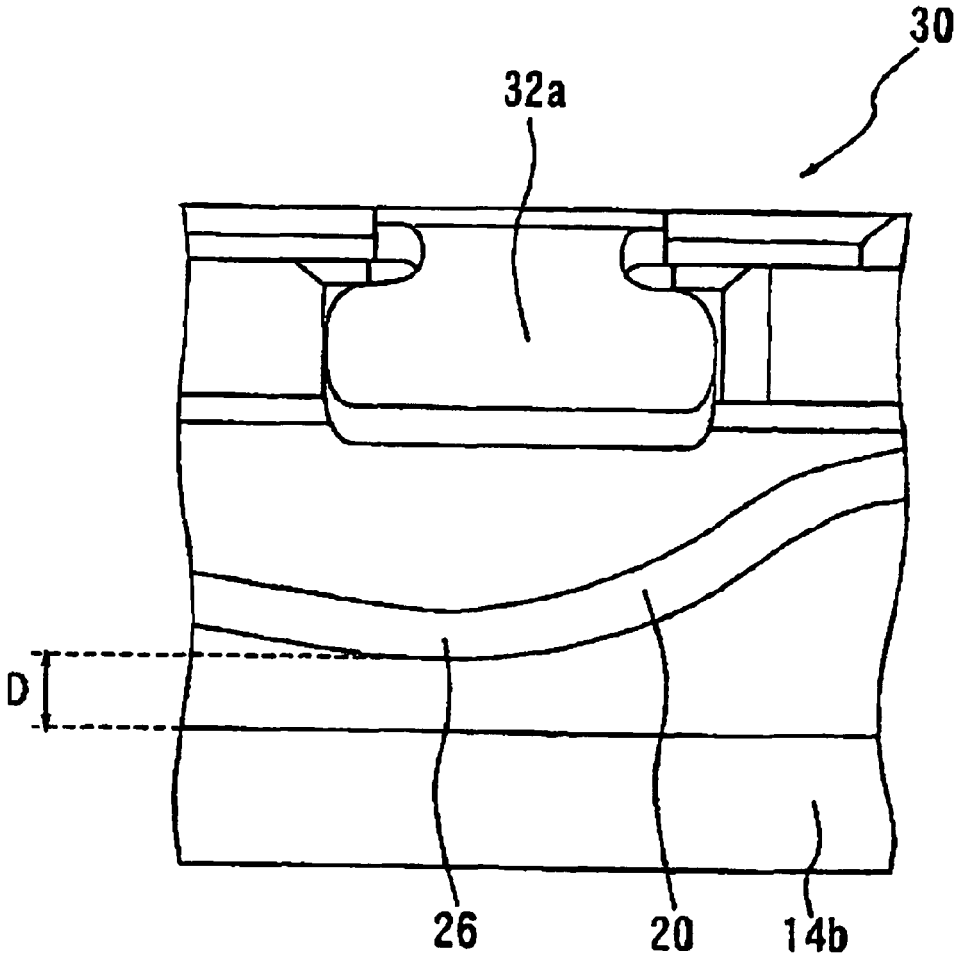
FIG. 6 is a partial enlarged view of a pressing part shown in FIG. 5.

FIG. 5 is a perspective view schematically showing a state in the process of inserting the male terminal into the female terminal in one embodiment of the invention, and FIG. 6 is a partial enlarged view of a pressing part shown in FIG. 5.

First, a case that the male terminal 10 is inserted into the female terminal 30 will be explained. Further, in the embodiment, a direction that the male terminal 10 is inserted into the female terminal 30 may be referred to as "insertion direction" and a direction that the male terminal 10 is removed from the female terminal 30 may be referred to as "removal direction". For example, the insertion direction and the removal direction are directions that are nearly parallel to longitudinal directions of the male terminal 10 and the female terminal 30. And, in the embodiment, the plate 40 is formed so as to be movable to at least the plate spring 20 along the insertion direction and the removal direction.

Referring to FIG. 5, before the male terminal 10 is inserted into the female terminal 30 or in the middle of inserting the male terminal 10 into the female terminal 30 along the insertion direction, the edge part 22 of the plate spring 20 is engaged with the plate spring insertion opening 42 of the plate spring 20. Due to this, the plate spring 20 is changed in shape and maintained to have the shape that a distance between the surface of the dimple 36 and the surface of the pressing part 26 is broader than a thickness of the male terminal 10 (particularly, the bottom plate 14b) to be inserted. Namely, a space is formed between the plate spring 20 and the bottom plate 14b so that the plate spring 20 is maintained to have a shape in the non-pressed state that the plate spring 20 does not press the male terminal 10.

Referring to FIG. 6, the plate 40 allows the plate spring 20 to maintain to have a shape in the non-pressed state, so that a space having a distance D is formed between the surface of the bottom plate 14b and the surface of the pressing part 26. In the embodiment, the distance D is broader than a thickness of the bottom plate 14b. Consequently, no force (no energizing force) is applied to the male terminal 10 (particularly, the bottom plate 14b) from the plate spring 20 until the male terminal 10 is inserted into an insertion position described below along the insertion direction.

Figure 7:
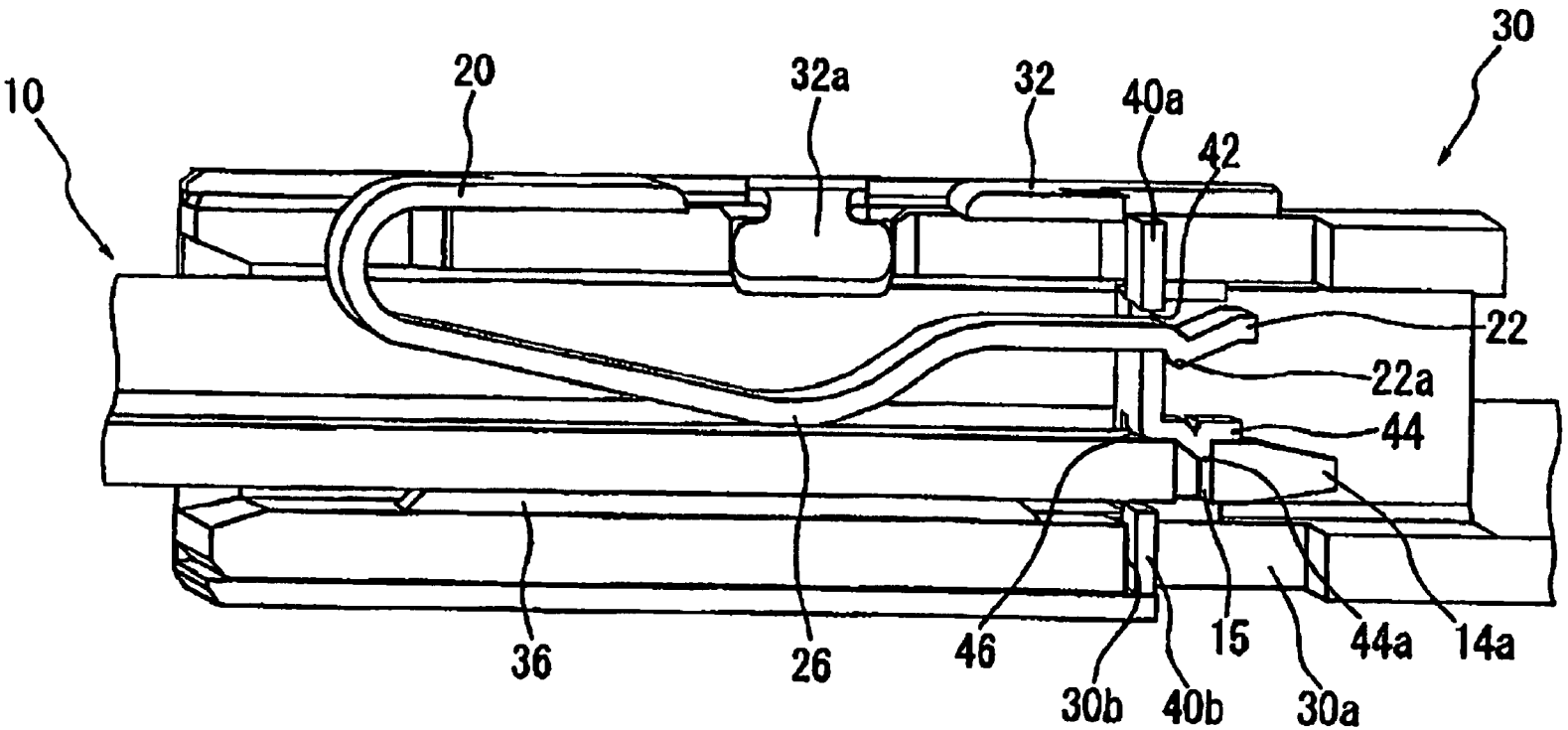
FIG. 7 is a perspective view schematically showing a state that the male terminal is inserted into the female terminal and an end part of the male terminal is held in the plate in one embodiment of the invention.
Figure 8:
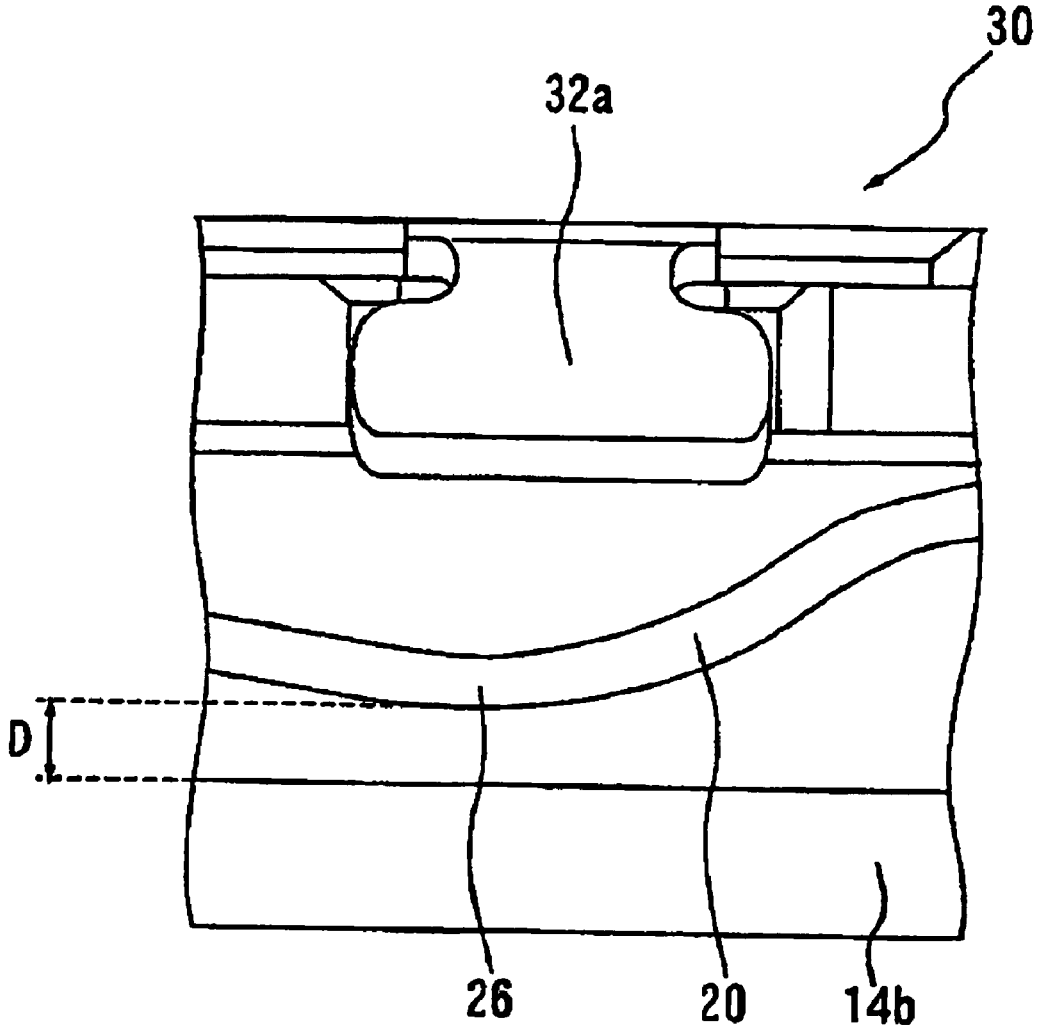
FIG. 8 is a partial enlarged view of a pressing part shown in FIG. 7.

FIG. 7 is a perspective view schematically showing a state that the male terminal is inserted into the female terminal and an end part of the male terminal is held in the plate in one embodiment of the invention, and FIG. 8 is a partial enlarged view of a pressing part shown in FIG. 7.

Next, a state that the male terminal 10 is further inserted into the female terminal 30 will be explained. In this case, the end portion 14a is inserted into the male terminal insertion opening 46 of the plate 40 and the protruding part 44a of the engaging part 44 is engaged with the engagement hole 15 of the male terminal 10, so that the male terminal 10 is held in the plate 40. Namely, when the male terminal 10 is inserted into the female terminal 30 from a state shown in FIG. 5 to a state shown in FIG. 7, the end portion 14a of the male terminal 10 is inserted into the male terminal insertion opening 46 in the vicinity of a position where the plate lower part 40b of the plate 40 contacts the opening sidewall 30b (a sidewall of the opening 30a on the near side to a side where the male terminal 10 is inserted), and the protruding part 44a of the engaging part 44 is engaged with the engagement hole 15.

In this state, the edge part 22 of the plate spring 20 remains in a state of being engaged with the plate spring insertion opening 42 of the plate 40. Consequently, as shown in FIG. 8, the plate 40 allows the plate spring 20 to maintain to have a shape in the non-pressed state, so that a space having a distance D is formed between the surface of the bottom plate 14b and the surface of the pressing part 26. In the case, the distance D is also broader than a thickness of the bottom plate 14b. Therefore, no force (no energizing force) is applied to the bottom plate 14b from the plate spring 20 until the male terminal 10 is inserted into an insertion position described below, and the surface of the bottom plate 14b of the male terminal 10 does not contacts the plate spring 20 and the bottom plate 14b is not pressed to the dimple 36.

Figure 9:
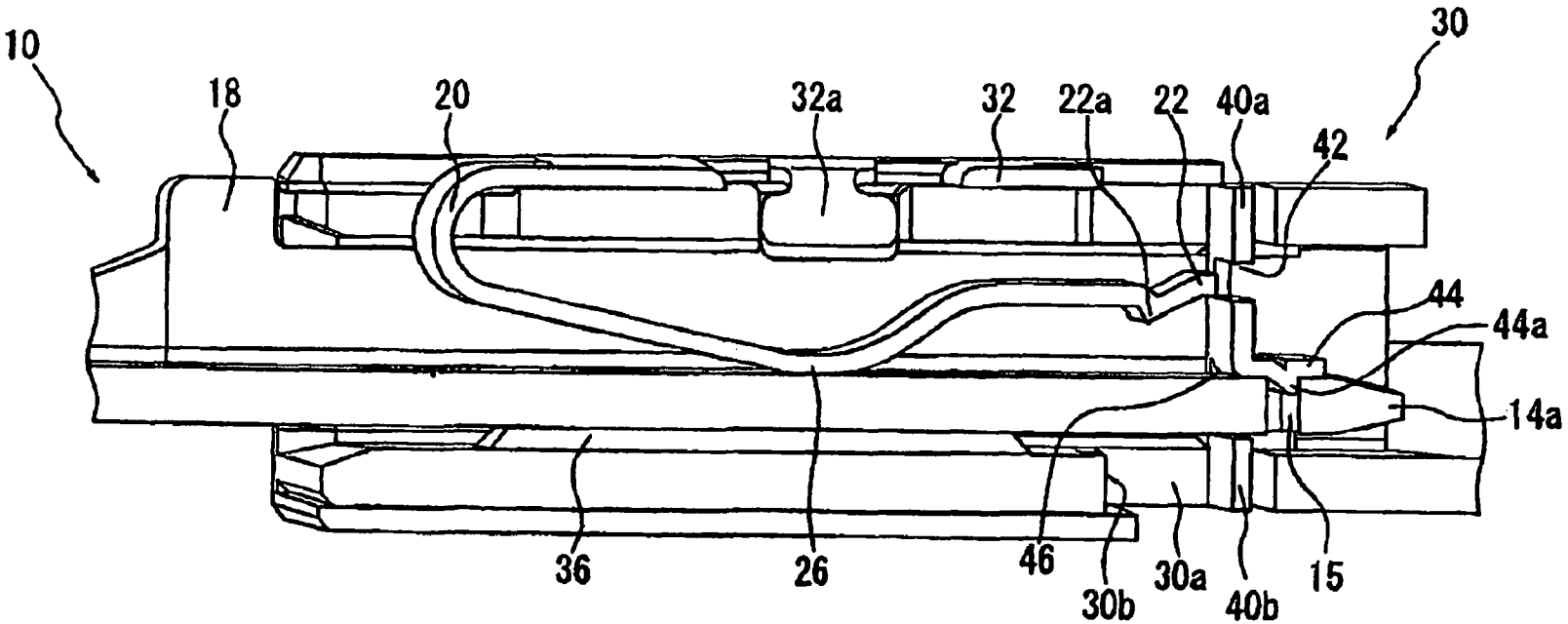
FIG. 9 is a perspective view schematically showing a state that the male terminal and the female terminal are electrically connected to each other in one embodiment of the invention.
Figure 10:
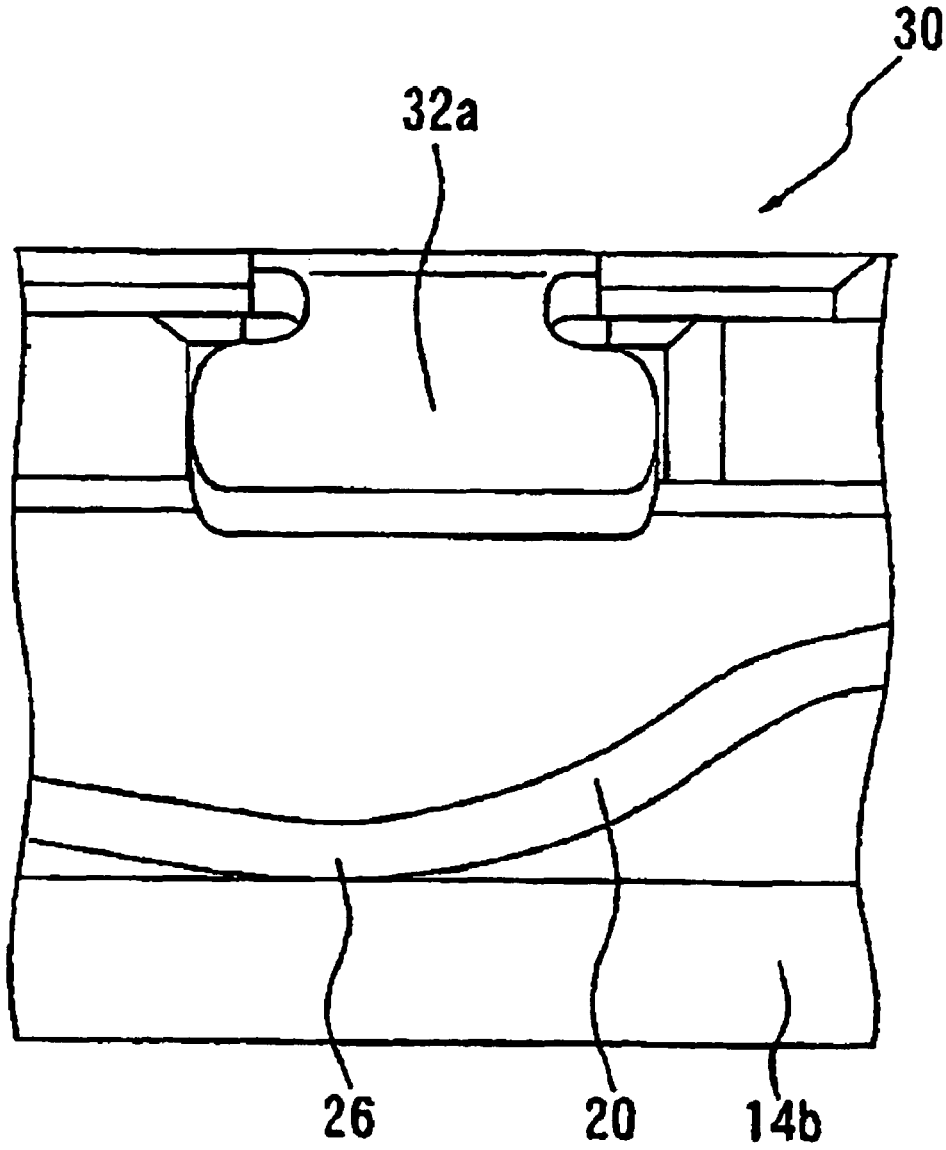
FIG. 10 is a partial enlarged view of a pressing part shown in FIG. 9.

FIG. 9 is a perspective view schematically showing a state that the male terminal and the female terminal are electrically connected to each other in one embodiment of the invention, and FIG. 10 is a partial enlarged view of a pressing part shown in FIG. 9.

Subsequently, when the male terminal 10 is further inserted into the female terminal 30, since the protruding part 44a of the engaging part 44 is engaged with the engagement hole 15, the plate 40 moves in a direction that the plate upper part 40a and the plate lower part 40b get away from the opening sidewall 30b in accordance with the movement of the male terminal 10 in the insertion direction. Here, a position of the plate spring insertion opening 42 of the plate 40 to the plate spring 20 also moves in accordance with the insertion of the male terminal 10. And, if the position of the plate spring insertion opening 42 moves to a position that is nearer to the position of the edge part 22 of the plate spring 20 than a position of the protruding part 22a of the edge part 22, the protruding part 22a is released from the plate spring insertion opening 42. Due to this, as shown in FIG. 9, the plate spring 20 is released from the plate 40. Further, a position of the plate 40 and a position of the male terminal 10 to the female terminal 30 where the protruding part 22a is released from the plate spring insertion opening 42 are referred to as "a connection position".

The plate 40 moves to the connection position, so that the plate spring 20 is released from the plate 40. And, as shown in FIG. 10, the plate spring 20 is changed in shape to have a shape that the pressing part 26 applies a pressure to the bottom plate 14b. Namely, the plate spring 20 contacts the bottom plate 14b, and the plate spring 20 is changed in shape and maintained to have the shape in the pressed state that the plate spring 20 presses the male terminal 10 (namely, being switched from the non-pressed state to the pressed state). Due to this, the bottom plate 14b electrically contacts the dimple 36 appropriately, so that the male terminal 10 and the female terminal 30 are electrically connected to each other, and large current can be fed between the male terminal 10 and the female terminal 30.

Figure 11:
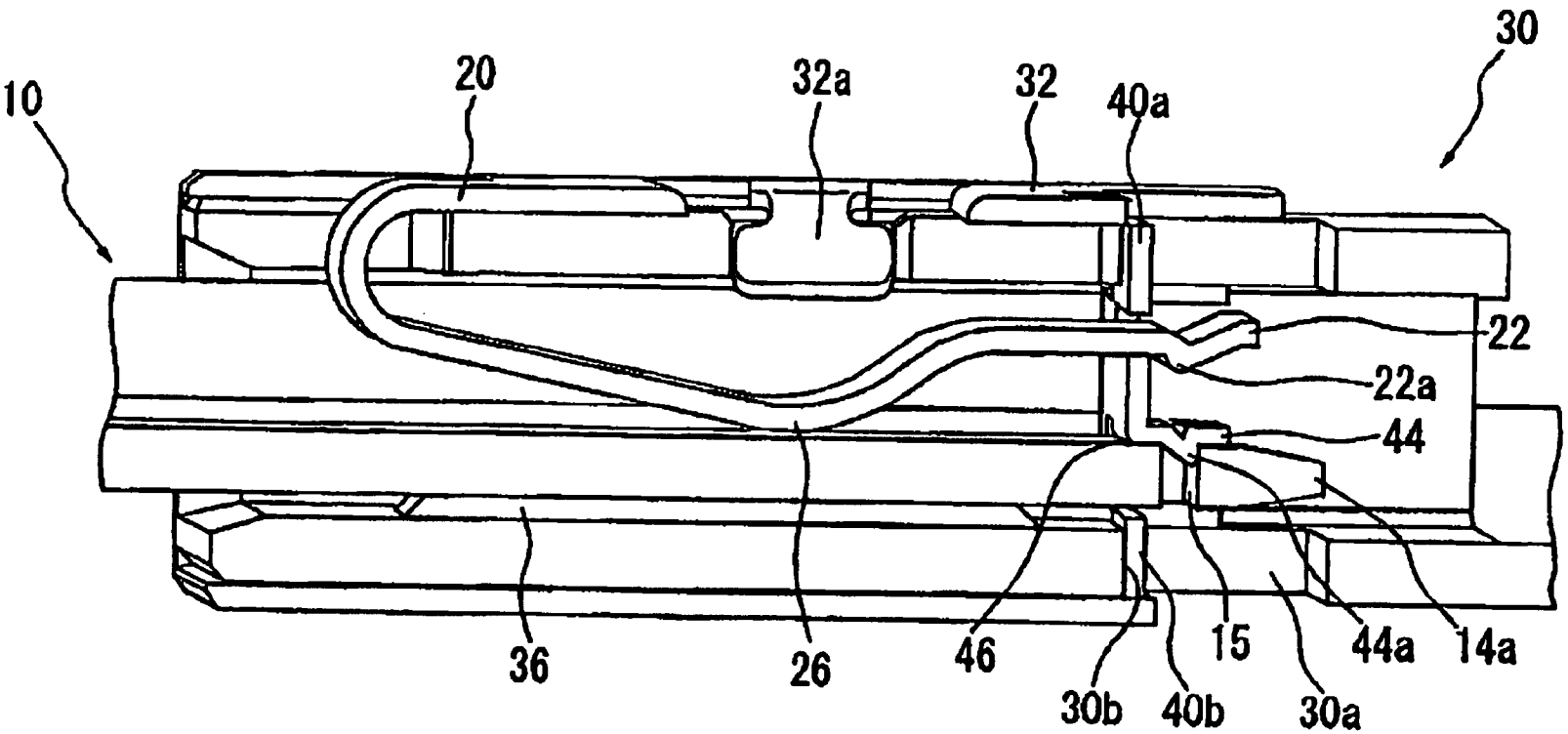
FIG. 11 is a perspective view schematically showing a state in the process of removing the male terminal from the female terminal in one embodiment of the invention.
Figure 12:
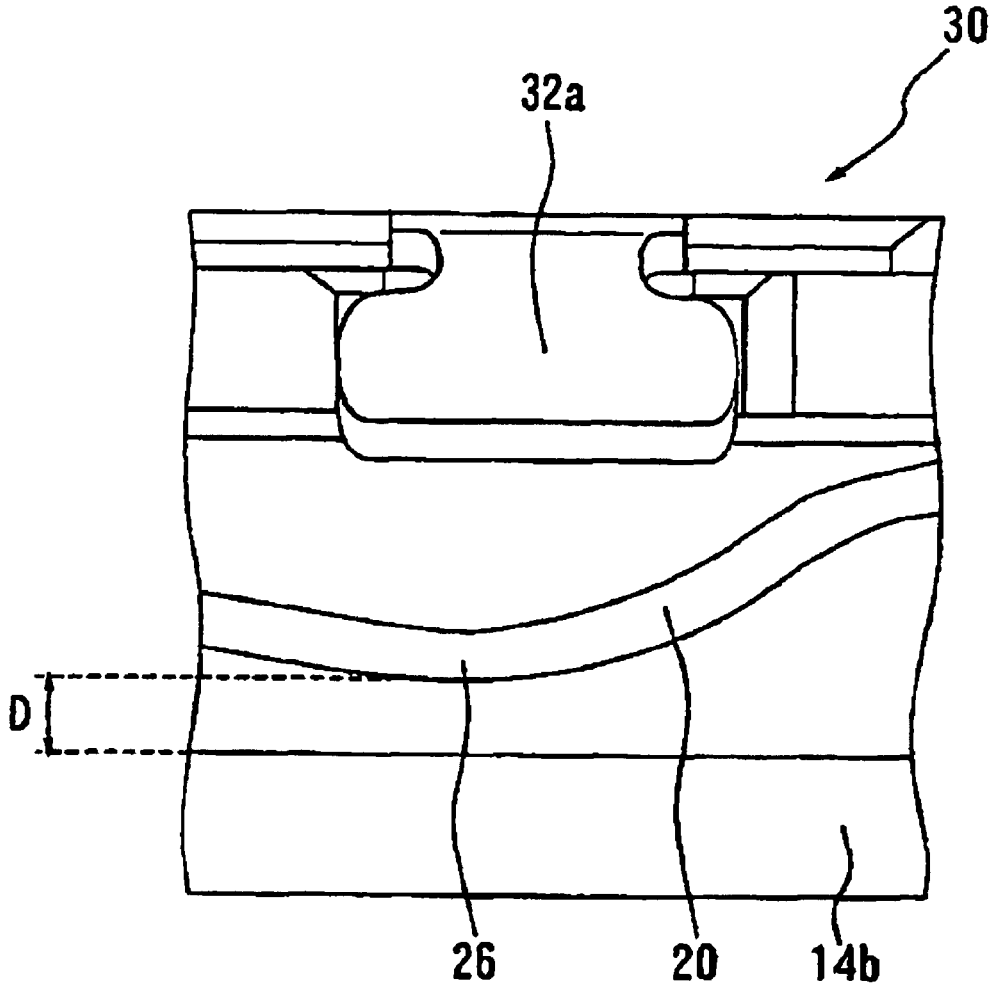
FIG. 12 is a partial enlarged view of a pressing part shown in FIG. 11.

FIG. 11 is a perspective view schematically showing a state in the process of removing the male terminal from the female terminal in one embodiment of the invention and FIG. 12 is a partial enlarged view of a pressing part shown in FIG. 11.

Next, in the male terminal 10 and the female terminal 30 constituting the male and female connection structure 1, a case that the male terminal 10 is removed from the female terminal 30 will be explained. Since the protruding part 44a of the engaging part 44 of the plate 40 is engaged with the engagement hole 15, in accordance with the movement of the male terminal 10 along the removal direction from the female terminal 30, the plate 40 also follows the movement of the male terminal 10. And, when the plate spring insertion opening 42 of the plate 40 reaches a position apart from the connection position in the removal direction, the edge part 22 of the plate spring 20 is inserted into the plate spring insertion opening 42 and the protruding part 22a is engaged with the plate spring insertion opening 42 again. And, as shown in FIG. 11, the plate spring 20 is switched and maintained in shape again to have the shape in the non-pressed state from the pressed state. Due to this, the male terminal 10 is electrically cut from the female terminal 30.

In this state, as shown in FIG. 12, the pressing part 26 does not contact the bottom plate 14b, and the plate spring 20 is maintained to have a shape in the non-pressed state having the space of the distance D, so that the plate spring 20 does not press the bottom plate 14b. And, when the male terminal 10 is further moved in the removal direction from the female terminal 30 (a direction to get away from the connection position and to be apart from the crimping part 34), the plate lower part 40b butts against the opening sidewall 30b. When the plate lower part 40b butts against the opening sidewall 30b, the protruding part 44a of the engaging part 44 is removed from the engagement hole 15 of the male terminal 10, so that the male terminal 10 is disengaged from the plate 40. Due to this, the male terminal 10 can be removed from the female terminal 30.

Advantages of the Embodiment

The male and female connection structure 1 according to the embodiment of the invention includes the female terminal 30 having the plate 40 that is capable of automatically switching a shape of the plate spring 20 for pressing the male terminal 10 toward the dimple 36 between the pressed state and the non-pressed state in accordance with the insertion of the male terminal 10 into the female terminal 30, namely, the male and female connection structure 1 includes the plate 40 as a press switching part that is capable of switching from the non-pressed state to the pressed state, if the male terminal 10 is inserted up to the connection position, by using an insertion force applied when the male terminal 10 is inserted into the female terminal 30, and switching from the press state to the non-pressed state, if the male terminal 10 is removed from the connection position, by using an removal force applied when the male terminal 10 is removed from the female terminal 30, so that in both cases that the male terminal 10 is inserted into the female terminal 30 and the male terminal 10 is removed from the female terminal 30, a pressing down operation that an operator presses down the plate spring 20 separately by using a lock arm or the like becomes unnecessary, and simultaneously, it can be prevented that a force from the plate spring 20 is applied to the male terminal 10, and as a result, the male terminal 10 can be easily inserted and removed into (from) the female terminal 30. Further, when the male terminal 10 is inserted and removed into (from) the female terminal 30, the surfaces of the male terminal 10 and the dimple 36 can be prevented from abrasion.

And, the male and female connection structure 1 according to the embodiment of the invention can use the plate 40 which is increased in a force (an energizing force) for pressing the male terminal 10 to the dimple 36, so that a resistance of contact part between the male terminal 10 and the dimple 36 of the female terminal 30 can be reduced. Here, in the embodiment, when the male terminal 10 is inserted and removed into (from) the female terminal 30, the plate spring 20 does not press the male terminal 10 to the dimple 36, so that the surfaces of the male terminal 10 and the dimple 36 can be prevented from abrasion and simultaneously, the male and female connection structure 1 corresponding to a large current application can be provided.

Further, the male and female connection structure 1 according to the embodiment of the invention can use the plate spring 20 which has a large energizing force, so that it can be appropriately applied to, for example, a harness etc. for a motor car or the like which causes a vibration exceedingly.

In the male and female connection structure 1 according to the embodiment of the invention, when the male terminal 10 is inserted and removed into (from) the female terminal 30, the space of the distance D is formed between the surface of the bottom plate 14b and the surface of the pressing part 26, but it is not indispensable to form the distance D. Namely, the male and female connection structure 1 can have a structure that at the insertion and removal of the male terminal 10 into (from) the female terminal 30, the pressing part 26 contacts the bottom plate 14b to an extent that the pressing part 26 does not press the bottom plate 14b within a range of preventing the surfaces of male terminal 10 and dimple 36 from being worn away.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A male and female connection structure, comprising:

a female terminal; and a male terminal to electrically connect to the female terminal by being inserted into a connection position of the female terminal and to electrically disconnect from the female terminal by being withdrawn from the connection position, wherein the female terminal comprises:

a dimple to electrically connect to the male terminal;

a male terminal pressing spring disposed opposite the dimple for pressing the male terminal to be inserted on the dimple against the dimple; and a press switching part for switching between a non-pressed state that the male terminal pressing spring does not press the male terminal located in the female terminal and a pressed state that the male terminal pressing spring presses the male terminal located in the female terminal, by changing a shape of the male terminal pressing spring, wherein the press switching part switches the non-pressed state to the pressed state, when the male terminal is inserted into the connection position, by using an insertion force applied when the male terminal is inserted into the female terminal, and wherein the press switching part switches the pressed state to the non-pressed state, when the male terminal is withdrawn from the connection position, by using a withdrawal force applied when the male terminal is withdrawn from the female terminal.

2. The male and female connection structure according to claim 1, wherein the press switching part comprises a spring insertion opening for engaging with an edge part of the male terminal pressing spring before the male terminal is inserted into the female terminal, and a male terminal insertion opening for engaging with an end part of the male terminal at a position adjacent to the spring insertion opening, and wherein when the male terminal moves to the connection position along an insertion direction in which the male terminal is inserted while the end part of the male terminal is engaged with the male terminal insertion opening, the spring insertion opening is disengaged from the edge part of the male terminal pressing spring so as to switch the non-pressed state to the pressed state.

3. The male and female connection structure according to claim 2, wherein when the male terminal moves along a withdrawal direction in which the male terminal is withdrawn and away from the connection position while the end part of the male terminal is engaged with the male terminal insertion opening, the spring insertion opening is engaged with the edge part of the male terminal pressing spring so as to switch the pressed state to the non-pressed state.

4. The male and female connection structure according to claim 3, wherein the press switching part is movable with respect to the male terminal pressing spring along the insertion direction and the withdrawal direction.

5. The male and female connection structure according to claim 4, wherein after the male terminal is inserted into the female terminal and the end part of the male terminal is engaged with the male terminal insertion opening, the press switching part moves to the connection position according as the male terminal moves in the insertion direction, and wherein the spring insertion opening is disengaged from the edge part of the male terminal pressing spring at the connection position according as the male terminal moves in the insertion direction.

6. The male and female connection structure according to claim 4, wherein the press switching part moves according as the male terminal moves in the withdrawal direction, and wherein the spring insertion opening is engaged with the edge part of the male terminal pressing spring at a position away from the connection position in the withdrawal direction according as the male terminal moves in the withdrawal direction.

7. The male and female connection structure according to claim 1, wherein the male terminal is inserted in a gap between the male terminal pressing spring and the dimple.

8. The male and female connection structure according to claim 1, wherein, in the pressed state, the male terminal pressing spring and the dimple are placed on opposite sides of the male terminal.

9. The male and female connection structure according to claim 1, wherein the male terminal pressing spring presses the male terminal toward the dimple.

10. The male and female connection structure according to claim 1, wherein the press switching part comprises a spring insertion opening for engaging with an edge part of the male terminal pressing spring before the male terminal is inserted into the female terminal.

11. The male and female connection structure according to claim 10, wherein the press switching part further comprises a male terminal insertion opening for engaging with an end part of the male terminal at a position adjacent to the spring insertion opening.

12. The male and female connection structure according to claim 1, wherein the press switching part is movable with respect to the male terminal pressing spring along an insertion direction and a withdrawal direction of the male terminal.

*13. A male and female connection structure, comprising:*

*a female terminal; and*

*a male terminal to electrically connect to the female terminal by being inserted into a connection position of the female terminal and to electrically disconnect from the female terminal by being withdrawn from the connection position,*

*wherein the female terminal comprises:*

*a dimple to electrically connect to the male terminal;*

*a male terminal pressing spring disposed opposite the dimple for pressing the male terminal to be inserted on the dimple against the dimple; and*

*a press switching part for switching between a non-pressed state that the male terminal pressing spring does not press the male terminal located in the female terminal and a pressed state that the male terminal pressing spring presses the male terminal located in the female terminal by changing a shape of the male terminal pressing spring by moving along a longitudinal direction of the female terminal,*

*wherein the press switching part engages with an edge part of the male terminal pressing spring before the male terminal is inserted into the female terminal,*

*wherein the press switching part switches the non-pressed state to the pressed state, when the male terminal is inserted into the connection position, by releasing an engaged edge part of the male terminal pressing spring by moving the press switching part along the longitudinal direction of the female terminal, and*

*wherein the press switching part switches the pressed state to the non-pressed state, when the male terminal is withdrawn from the connection position.*

*14. The male and female connection structure according to claim 13, wherein the press switching part switches the non-pressed state to the pressed state by using an insertion force applied when the male terminal is inserted into the female terminal.*

*15. The male and female connection structure according to claim 13, wherein the press switching part switches the pressed state to the non-pressed state by using a withdrawal force applied when the male terminal is withdrawn from the female terminal.*

* * * * *